2031X
P. Obert,
Motor.
Patented Dec. 18, 1813.
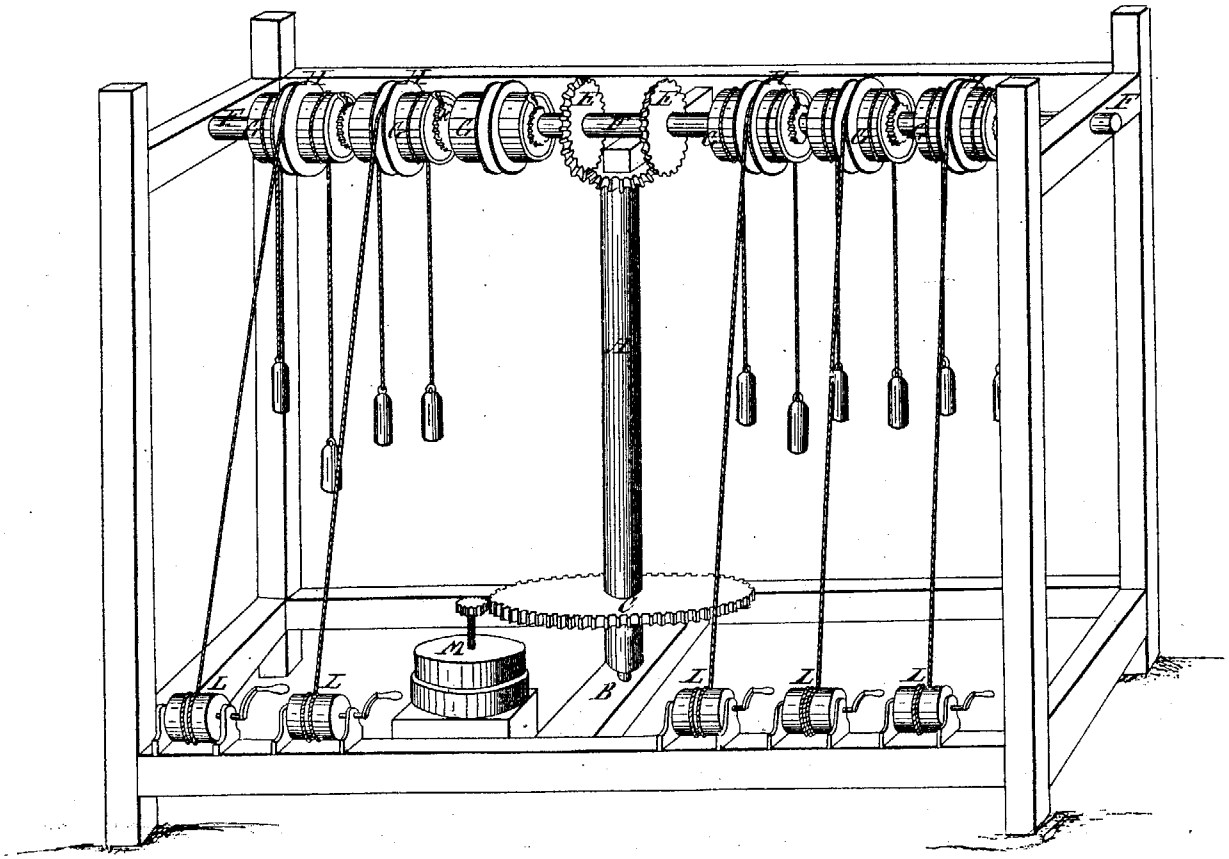
AM. PHOTO-LITHO. CO. N.Y. (OSBORNE'S PROCESS)

Peter Obert 2031X 1

Letters Patent

The Schedule [illegible] to in these Letters Patent and making part of the same Containing a description in the words of the said Peter Obert himself of his method of giving [illegible] motion to any machinery by weights —

The frame in which the machine is built consists of four upright posts with proper cross bars. —

The upright shaft [illegible] supported at the bottom in [illegible] in a cross piece in the centre of the machine having at the bottom a [illegible] wheel and a [illegible] cog wheel at the top [illegible] with one [illegible] the last mentioned [illegible] are [illegible] [illegible] upright [illegible] supported in the cross piece at the right and left [illegible] the top of the above mentioned frame [illegible] the said shaft [illegible] through [illegible] [illegible] round the said shaft in the centre of each [illegible] is fixed a large pulley wheel that receives a band to the above mentioned weight and between each of the said Cylinders is fixed a [illegible] wheel a Spring [illegible] [illegible] ratchet wheel [illegible] the [illegible] [illegible] winding up the [illegible] of the Cylinders [illegible] the said shaft [illegible] way when winding [illegible] the spring catches holds fast and prevents the large pulley wheel and cylinders from running back and makes them turn with the shaft as the weights [illegible] down.

Each of the aforementioned [illegible] [illegible] [illegible] [illegible] which suspends a weight which is fixed at the [illegible] of the said rope. A band goes round the large pulley wheels and [illegible] again to the bottom of the machine in front and [illegible] round pulleys. [illegible] last mentioned rope is for the purpose of winding up the above mentioned weights that are suspended to the above mentioned Cylinders. By the [illegible] of the above described Machinery the motion of the machine [illegible] by winding up the weights singly. At the bottom of the machine is

2031X placed a short perpendicular shaft which turns on pivots and having a
small cog wheel at the top and a large one at the bottom, of the [illegible]
on the upright shaft and the large one at the bottom turns an upright
shaft with a wheel block to it representing a mill stone this last [illegible]
-tioned part of the machine is intended to shew how the power of the prin-
-ciple of this invention can be applied either to mills or other purposes Witnesses
William Thornton
Geo. Dyer Peter [illegible]

[illegible]

drawing made from [illegible]